C. E. MOREHOUSE.
HOSE SUPPORTER.
APPLICATION FILED JAN. 11, 1917.
1,309,691.  
Patented July 15, 1919.  
3 SHEETS—SHEET 1.
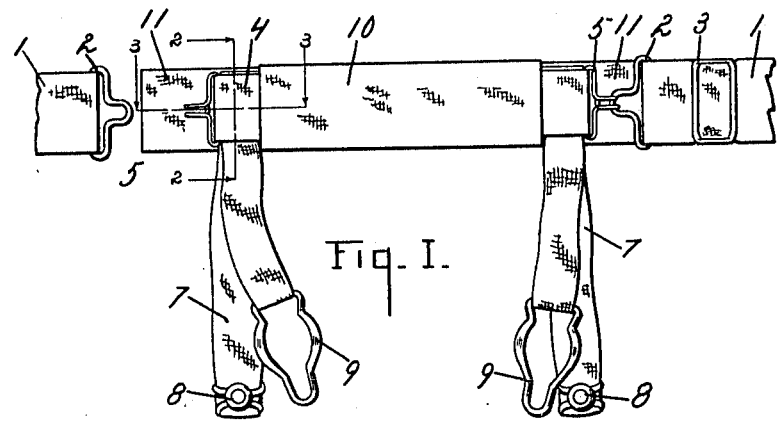
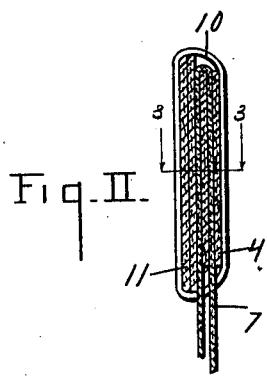
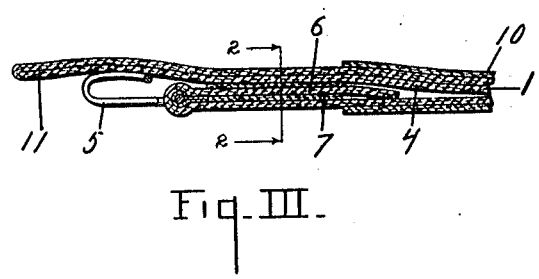
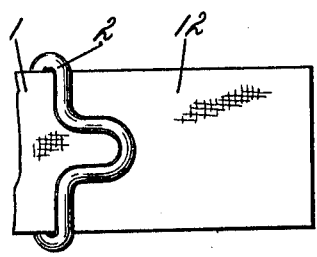
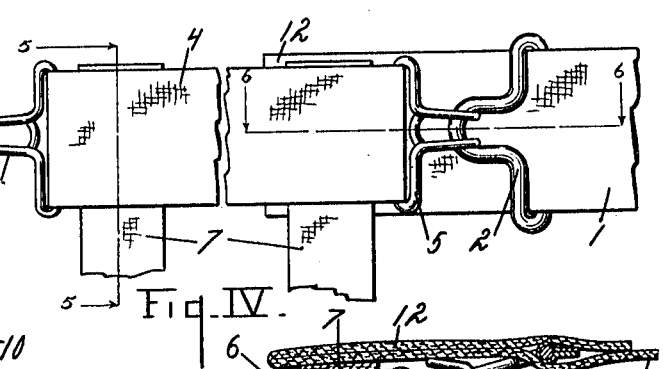
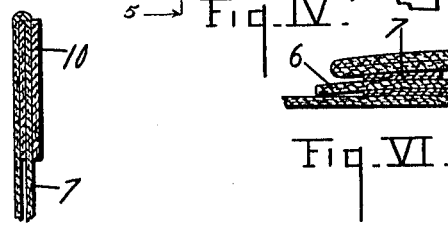
WITNESSES:  
Lenn Gilman  
Luther Blake
INVENTOR.  
CYRUS E. MOREHOUSE  
BY Chappell Earl  
ATTORNEYS.

C. E. MOREHOUSE.
HOSE SUPPORTER.
APPLICATION FILED JAN. 11, 1917.
1,309,691.
Patented July 15, 1919.
3 SHEETS—SHEET 2.
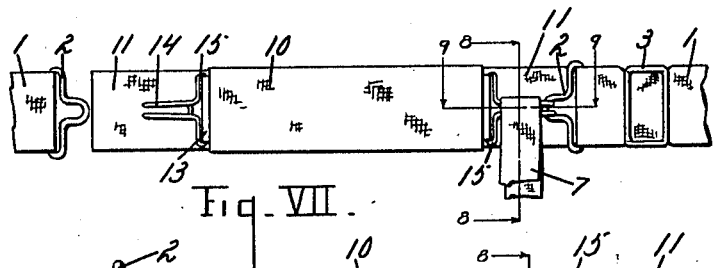
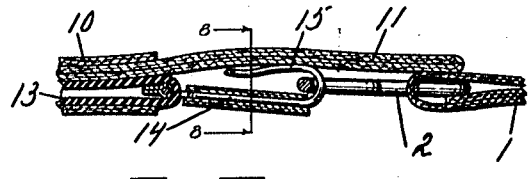
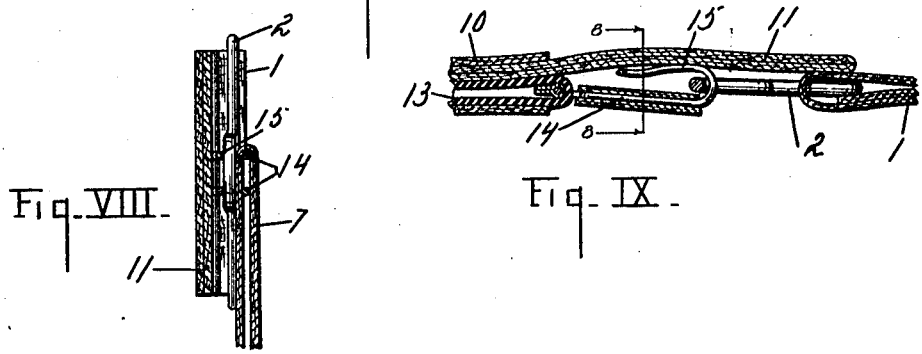
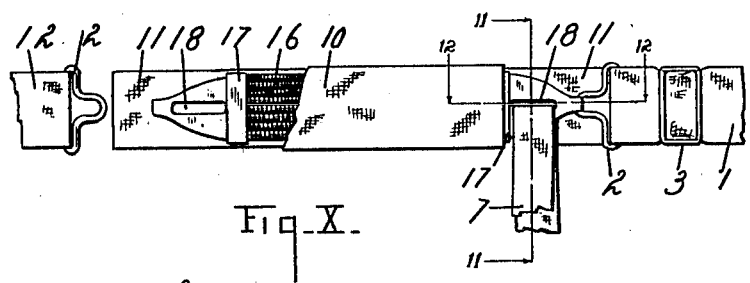
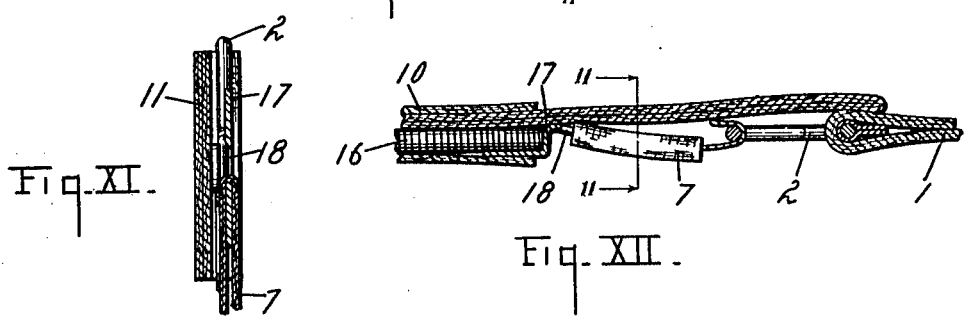
WITNESSES:
Lenn Gilman
Luther Blake
INVENTOR.
CYRUS E. MOREHOUSE
BY Chappell & Earl
ATTORNEYS.

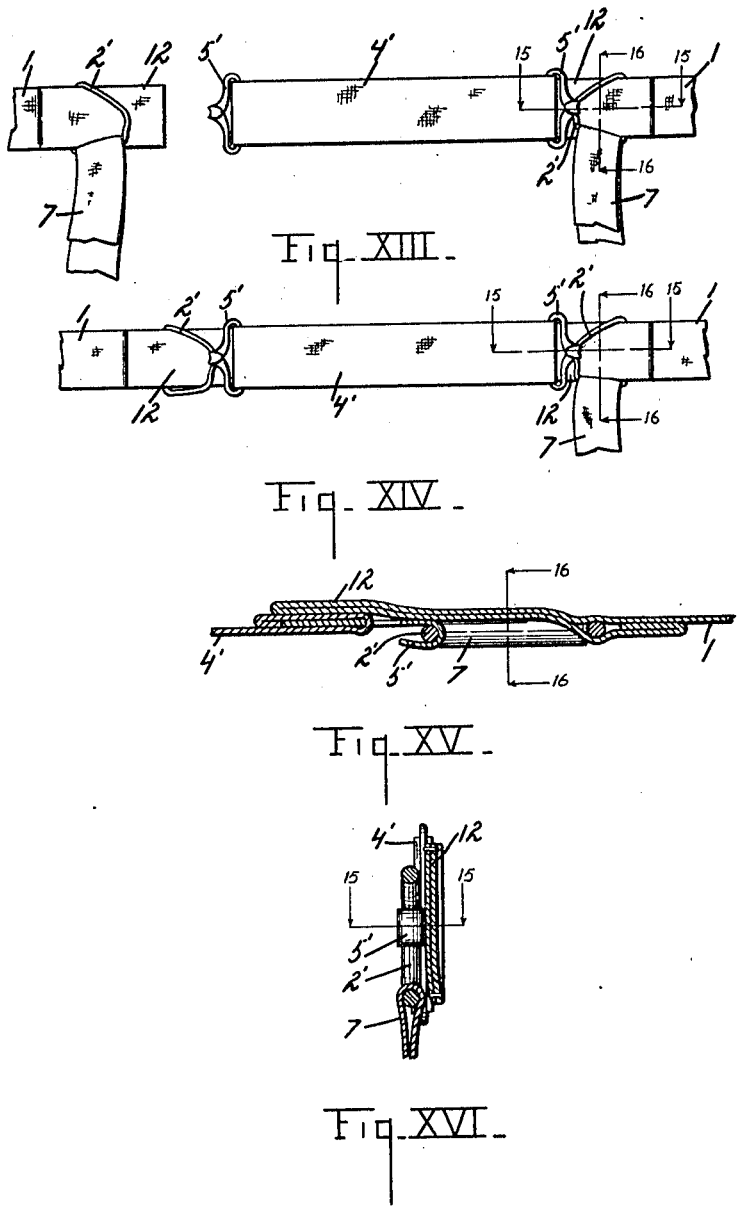

UNITED STATES PATENT OFFICE.

CYRUS E. MOREHOUSE, OF MILWAUKEE, WISCONSIN.

HOSE-SUPPORTER.

1,309,691.  Specification of Letters Patent.  Patented July 15, 1919.

Application filed January 11, 1917. Serial No. 141,880.

*To all whom it may concern:*

Be it known that I, CYRUS E. MOREHOUSE, a citizen of the United States, residing at Milwaukee, county of Milwaukee, State of Wisconsin, have invented certain new and useful Improvements in Hose-Supporters, of which the following is a specification.

This invention relates to improvements in hose supporters.

The main objects of this invention are:

First, to provide an improved hose supporter of the limb encircling type.

Second, to provide an improved hose supporter of the limb encircling type which effectively supports the hose without binding the limb.

Third, to provide an improved hose supporter in which the parts which come in contact with the person and are likely to become soiled may be of washable material.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail front view of my improved hose supporter, the limb encircling strap being shown disengaged at one end.

Fig. II is an enlarged detail transverse section on a line corresponding to line 2—2 of Figs. I and III.

Fig. III is an enlarged detail longitudinal section on a line corresponding to line 3—3 of Figs. I and II.

Fig. IV is a detail front elevation of another embodiment of my invention in which the casing for the resilient member is omitted.

Fig. V is a detail transverse section on a line corresponding to line 5—5 of Fig. IV.

Fig. VI is a detail longitudinal section on a line corresponding to line 6—6 of Fig. IV.

Fig. VII is a detail front view of another embodiment of my invention.

Fig. VIII is a detail transverse section on a line corresponding to line 8—8 of Figs. VII and IX.

Fig. IX is a detail longitudinal section on a line corresponding to line 9—9 of Fig. VII.

Fig. X is a detail front view of another embodiment of my invention in which coiled springs are employed for the resilient member.

Fig. XI is a detail transverse section on a line corresponding to line 11—11 of Figs. X and XII.

Fig. XII is a detail longitudinal section on a line corresponding to line 12—12 of Fig. X.

Fig. XIII is a detail front view of another embodiment of my improvements in which the ends of the strap are extended, as shown in Fig. IV, the hanger strips, however, being suspended from the strap instead of from the resilient member.

Fig. XIV is a front view of the embodiment of Fig. XIII with one of the hanger straps removed.

Fig. XV is a detail longitudinal section on a line corresponding to line 15—15 of Figs. XIII, XIV and XVI.

Fig. XVI is a detail transverse section on a line corresponding to line 16—16 of Figs. XIII, XIV and XV. In the drawing, similar reference characters refer to similar parts throughout the several views, and the sectional views are taken looking in the direction of the little arrows at the ends of the section lines.

Referring to the drawing, I provide a limb encircling strap 1 of non-elastic washable material. The strap 1 has eyes 2 at its ends and is preferably provided with an adjusting buckle 3. An elastic or resilient member 4 is provided, the same being preferably formed of elastic webbing. The member 4 is provided with inwardly facing hooks 5 at each end adapted to engage the eyes 2 on the ends of the strap 1. The elastic member 4 is provided with loops 6 at its ends through which the hanger straps 7 are looped or passed. The ends of these hanger straps 7 are provided with studs 8 and coacting loops 9.

A casing 10 is provided for the resilient member, the rear wall of the casing being extended at each end beyond the front wall to provide shield or guard tongues 11 which project under the hooks 5 and the eyes 2 when they are engaged, preventing the hooks coming in contact with the person of the wearer. The casing is in the form of a tube and is of such length that its loops 6 project therefrom so that the straps 7 depend at the end of the casing and constitute means for retaining the resilient member within the casing. These hanger straps are also formed of washable material, as is also the casing, so that the parts may be disassembled and all laundried except the resilient member, which would be injured by such laundrying. However, the resilient member is protected by the casing so that it is kept clean and guarded from coming in contact with the person of the wearer.

The ends of the straps 7 hang free from the encircling band and may be conveniently engaged with the hose and, owing to their position, effectively support the hose without undue stress upon the limb of the wearer. The pull upon the strap does not tighten the encircling band or dislocate it.

In the modification shown in Figs. IV, V, and VI the casing 10 is omitted, but the ends of the straps 1 are extended at 12 to provide protecting tongues, the tongues being of such length that they extend well under the resilient member 4, the resilient member being the same as that previously illustrated and described.

In the embodiment shown in Figs. VII to IX, inclusive, the resilient member 13 is in the form of an elastic band. The shanks 14 of the hooks 15 are of such length that the hanger straps 7 may be engaged therewith.

In the embodiment shown in Figs. X to XII, inclusive, the resilient member 16 comprises a plurality of coiled springs secured at their ends to the hooks 17. These hooks are formed of sheet metal and are provided with slots 18 through which the hanger straps 7 are passed. The resilient members in these two embodiments are disposed in a casing 10.

In the embodiment shown in Fig. XIII the eyes 2' of the limb encircling strap 1 are adapted to receive the hanger straps 7. The resilient members 4' are provided with suitable hooks 5' which engage these loops over the protecting tongues 12. The resilient members 4' are not provided with casings but, as these resilient members are formed of elastic webbing and are relatively short, they may be renewed as occasion requires to keep them sanitary. I, however, prefer to employ the casing as in the embodiment shown in Fig. I.

In Fig. XIV I show one of the hanger straps omitted. This form is preferred by some as it requires the attachment of only a single strap to the hose.

In the embodiment of Figs. XIII and XIV the hanger straps may, if desired, be permanently secured to the strap 1, as these hanger straps are formed of washable material so that the entire article is washable except the short resilient member which, as stated, can be renewed as occasion requires. Suitable material is usually at hand for this purpose although I contemplate supplying these resilient members to be substituted as desired.

My improved hose supporter is comparatively simple and economical in its parts and is very durable as the main parts can be laundried, as stated, while the elastic portion is protected by the casing, and even where the casing is not employed, contacts with the front portion of the limb, so that it is not likely to be affected by perspiration. My improved hose supporter is very convenient to use and supports the hose in a highly satisfactory manner.

I have not attempted to illustrate all the embodiments or applications of my improvements which I contemplate as I believe the disclosure made will enable those skilled in the art to which my invention relates to embody or adapt the same as conditions or taste may dictate.

Having thus described my invention, what I claim as new and desire to secure by Letters Patent, is:

1. In a hose supporter, the combination of a non-elastic washable strap provided with adjusting means and with eyes at each end, a resilient member having hanger strap loops at its ends and provided with inwardly facing hooks at its ends coacting with eyes of said strap, a washable tubular casing in which said resilient member is disposed with its hooks and its said hanger strap loops projecting therefrom, the ends of the rear wall of said casing being extended beyond the front wall to provide shield tongues at the rear of said strap eyes and said hooks, and non-elastic washable hanger straps disposed through said loops at the ends of said resilient member and constituting means for retaining said resilient member in said casing, the ends of the hanger straps being provided with coacting hose attaching studs and loops.

2. In a hose supporter, the combination of a non-elastic washable strap provided with adjusting means and with eyes at each end, a resilient member having hanger strap loops at its ends and provided with hooks at its ends coacting with said eyes of said strap, a washable tubular casing in which said resilient member is disposed with its hooks and its said hanger strap loops projecting therefrom, and non-elastic washable hanger straps disposed through said loops at the ends of said resilient member and constituting means for retaining said resilient member in said casing, the ends of the hanger straps being provided with coacting hose attaching studs and loops.

3. In a hose supporter, the combination of a non-elastic washable strap provided with adjusting means and with eyes at each end, a resilient member having hanger strap loops at its ends and provided with hooks at its ends coacting with said eyes of said strap, and non-elastic washable hanger straps disposed through said loops at the ends of said resilient member, the ends of each of said hanger straps being provided with coacting hose attaching studs and loops.

4. In a hose supporter, the combination of a non-elastic washable strap provided with adjusting means and with eyes at each end, a resilient member provided with hooks at its ends coacting with said eyes of said strap, a washable tubular casing in which said resilient member is disposed with its hooks projecting therefrom, the ends of the rear wall of said casing being extended beyond the front wall to provide shield tongues at the rear of said strap eyes and said hooks, and non-elastic washable hanger straps engaged with said resilient member and constituting means for retaining said resilient member in said casing, said hanger straps being provided with hose attaching means.

5. In a hose supporter, the combination of a non-elastic washable strap provided with adjusting means and with eyes at each end, a resilient member provided with hooks at its ends coacting with said eyes of said strap, a washable tubular casing in which said resilient member is disposed with its hooks projecting therefrom, and non-elastic washable hanger straps connected to each end of said resilient member and having each end provided with hose attaching means.

6. In a hose supporter, the combination of a strap, a resilient member provided with hanger strap loops at its ends, said strap and resilient member being provided with coacting coupling means, a casing in which said resilient member is disposed with its said hanger strap loops projecting therefrom, and hanger straps disposed through said loops at the ends of said resilient member and constituting means for retaining said resilient member in said casing, the ends of the hanger straps being provided with coacting hose attaching studs and loops.

7. In a hose supporter, the combination of a washable non-elastic strap, a resilient member, said strap and resilient member being provided with coacting coupling means, a washable tubular casing in which said elastic member is removably disposed, and non-elastic washable hanger straps removably connected to said resilient member and provided with hose attaching means.

In witness whereof, I have hereunto set my hand and seal in the presence of two witnesses.

CYRUS E. MOREHOUSE. [L. S.]

Witnesses:
HARRY ABRAM,
MARY CARASH.

Copies of this patent may be obtained for five cents each, by addressing the "Commissioner of Patents, Washington, D. C."